US010397959B2

(12) United States Patent
Lee et al.

(10) Patent No.: US 10,397,959 B2
(45) Date of Patent: *Aug. 27, 2019

(54) METHOD AND APPARATUS FOR PERFORMING RANDOM ACCESS PROCEDURE IN WIRELESS COMMUNICATION SYSTEM

(71) Applicant: LG ELECTRONICS INC., Seoul (KR)

(72) Inventors: Youngdae Lee, Anyang-si (KR); Sungjun Park, Anyang-si (KR); Seungjune Yi, Anyang-si (KR); Sunghoon Jung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,813

(22) Filed: Aug. 14, 2018

(65) Prior Publication Data

US 2019/0007976 A1    Jan. 3, 2019

Related U.S. Application Data

(63) Continuation of application No. 14/410,539, filed as application No. PCT/KR2013/005651 on Jun. 26, 2013, now Pat. No. 10,075,979.

(Continued)

(51) Int. Cl.
*H04W 74/08* (2009.01)
*H04W 4/70* (2018.01)
*H04W 76/14* (2018.01)

(52) U.S. Cl.
CPC ........ *H04W 74/0833* (2013.01); *H04W 4/70* (2018.02); *H04W 76/14* (2018.02)

(58) Field of Classification Search
None
See application file for complete search history.

(56) References Cited

U.S. PATENT DOCUMENTS

2003/0103476 A1    6/2003   Choi et al.
2005/0181811 A1    8/2005   Magnusson et al.
(Continued)

FOREIGN PATENT DOCUMENTS

CN    102164421    8/2011
CN    102348214    2/2012
(Continued)

OTHER PUBLICATIONS

Japan Patent Office Application No. 2015-520014, Office Action dated Jan. 24, 2017, 3 pages.
(Continued)

*Primary Examiner* — Frantz Bataille
(74) *Attorney, Agent, or Firm* — Lee Hong Degerman Kang & Waimey

(57) ABSTRACT

A method and apparatus for performing a random access procedure in a wireless communication system is provided. A user equipment (UE) determines one random access configuration from a first random access configuration for a normal type of UE and a second random access configuration for a specific type of UE, and transmits a random access preamble based on the second random access configuration to an eNodeB (eNB) if the UE is a specific type of UE. Also, a method and apparatus for establishing, by a UE, a connection in a wireless communication system is provided. The UE transmits a connection request message including bandwidth related information to the eNB.

6 Claims, 11 Drawing Sheets

Related U.S. Application Data

(60) Provisional application No. 61/664,763, filed on Jun. 27, 2012.

(56) References Cited

U.S. PATENT DOCUMENTS

| | | | |
|---|---|---|---|
| 2009/0041240 | A1 | 2/2009 | Parkvall et al. |
| 2010/0009675 | A1 | 1/2010 | Wijting et al. |
| 2010/0323736 | A1 | 12/2010 | Fischer et al. |
| 2011/0199905 | A1 | 8/2011 | Pinheiro et al. |
| 2011/0243083 | A1* | 10/2011 | Zhang ............ H04W 8/22 370/329 |
| 2011/0261759 | A1 | 10/2011 | Yamada et al. |
| 2011/0268084 | A1 | 11/2011 | Tanabe et al. |
| 2011/0292893 | A1* | 12/2011 | Lee ............ H04W 74/002 370/329 |
| 2012/0033613 | A1 | 2/2012 | Lin et al. |
| 2012/0077507 | A1* | 3/2012 | Lee ............ H04W 74/006 455/450 |
| 2012/0184281 | A1* | 7/2012 | Kim ............ H04W 72/0453 455/450 |
| 2013/0089061 | A1 | 4/2013 | Lim et al. |
| 2015/0327308 | A1 | 11/2015 | Lim et al. |
| 2015/0365976 | A1 | 12/2015 | Lee et al. |

FOREIGN PATENT DOCUMENTS

| | | |
|---|---|---|
| EP | 2584801 | 4/2013 |
| JP | 2009049815 A | 3/2009 |
| JP | 2013520100 | 5/2013 |
| JP | 2013527697 A | 6/2013 |
| JP | 2014504052 A | 2/2014 |
| WO | 2010126245 | 11/2010 |
| WO | 2011/099769 | 8/2011 |
| WO | 2011/100540 | 8/2011 |
| WO | 2011136620 A2 | 11/2011 |
| WO | 2011/158377 | 12/2011 |
| WO | 2011162565 | 12/2011 |
| WO | 2012063037 A1 | 5/2012 |
| WO | 2013/049768 | 4/2013 |

OTHER PUBLICATIONS

U.S. Appl. No. 14/410,539, Notice of Allowance dated May 8, 2018, 33 pages.
U.S. Appl. No. 14/410,539, Final Office Action dated May 13, 2016, 37 pages.
U.S. Appl. No. 14/410,539, Office Action dated Nov. 5, 2015, 2 pages.
Renesas Mobile Europe Ltd., "RAN Efficiency Improvement Schemes", 3GPP TSG-RAN WG2 #75bis, R2-115317, Oct. 3, 2011, 4 pages.
PCT International Application No. PCT/KR2013/005651, Written Opinion of the International Searching Authority dated Sep. 27, 2013, 1 page.
State Intellectual Property Office of the People's Republic of China Application Serial No. 201380035522.9, Office Action dated Jul. 24, 2017, 6 pages.
European Patent Office Application Serial No. 17200991.2, Search Report dated Jan. 2, 2018, 11 pages.
Zte, "View on standards aspects impacting Mtc Ue costs", 3GPP Tsg Ran WG1 Meeting #67, R1-113760, Nov. 2011, 6 pages.
ZTE Corporation, "Analysis of reducing the cost of LTE devices for MTC," 3GPP TSG RAN WG1 Meeting #66bis, R1-112997, Oct. 2011, 4 pages.
Japan Patent Office Application Serial No. 2015-520014, Office Action dated Jan. 5, 2016, 3 pages.
European Patent Office Application Serial No. 13809425.5, Search Report dated Jan. 12, 2016, 10 pages.
PCT International Application No. PCT/KR2013/005651, International Search Report dated Sep. 27, 2013, 3 pages.

* cited by examiner

METHOD AND APPARATUS FOR PERFORMING RANDOM ACCESS PROCEDURE IN WIRELESS COMMUNICATION SYSTEM

CROSS-REFERENCE TO RELATED APPLICATIONS

This application is a continuation of U.S. patent application Ser. No. 14/410,539, filed on Dec. 22, 2014, now U.S. Pat. No. 10,075,979, which is the National Stage filing under 35 U.S.C. 371 of International Application No. PCT/KR2013/005651, filed on Jun. 26, 2013, which claims the benefit of U.S. Provisional Application No. 61/664,763, filed on Jun. 27, 2012, the contents of which are all hereby incorporated by reference herein in their entirety.

BACKGROUND OF THE INVENTION

Field of the Invention

The present invention relates to wireless communications, and more particularly, to a method and apparatus for performing a random access procedure in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

3GPP LTE may introduce a machine type communication (MTC). The MTC is a form of data communication which involves one or more entities that do not necessarily need human interaction. A service optimized for the MTC differs from a service optimized for human to human (H2H) communications. The MTC is different to current mobile network communication services as it involves:

Different market scenarios,
Data communications,
Lower costs and effort,
A potentially very large number of communicating terminals with,
To a large extent, little traffic per terminal.

MTC is an important revenue stream for operators and has a huge potential from the operator perspective. There are several industry forums working on an efficient M2M system with some industry members developing a new access technology dedicated for MTC. However, it is more efficient for operators to be able to serve MTC user equipments (UEs) using already deployed radio access technology. Therefore, it is important for operators to understand whether 3GPP LTE could be a competitive radio access technology for efficient support of MTC. It is envisaged that MTC UEs will be deployed in huge numbers, large enough to create an eco-system on its own. Lowering the cost of MTC UEs is an important enabler for implementation of the concept of "internet of things". MTC UEs used for many applications will require low operational power consumption and are expected to communicate with infrequent small burst transmissions.

Meanwhile, in 3GPP LTE, a cell bandwidth can be scalable. A LTE cell supports one of 1.4 MHz, 3 MHz, 5 MHz, 10 MHz, 15 MHz and 20 MHz. If a UE supports 3GPP LTE, the UE should support at least 20 MHz cell bandwidth. The UE can work with any cell bandwidth. But, all LTE UEs should work in a cell of 20 MHz bandwidth. Namely, 20 MHz is the minimum UE capability that the LTE UEs should support.

Normally, an MTC device is considered as low cost device on the market. The fact that an LTE UE should support at least 20 MHz could increase cost of an MTC device supporting 3GPP LTE. Thus, it is considered that if an LTE UE operates as an MTC device, this type of LTE UE can reduce supported cell bandwidth. For instance, this type of UE may support only 1.4 MHz, 3 MHz, or 5 MHz bandwidth.

A method for performing a random access procedure and a connection establishment for a specific type of UE, e.g. an MTC device, may be proposed.

SUMMARY OF THE INVENTION

The present invention provides a method and apparatus for performing a random access procedure in a wireless communication system. The present invention provides a method for performing, by a user equipment (UE), a random access procedure for a specific type of UE when the UE is the specific type of the UE. The present invention also provides a method for establishing, by a UE, connection for a specific type of UE when the UE is the specific type of the UE.

In an aspect, a method of performing, by a user equipment (UE), a random access procedure in a wireless communication system is provided. The method includes determining one random access configuration from a first random access configuration and a second random access configuration. The first random access configuration is a random access configuration for a normal type of UE, and the second random access configuration is a random access configuration for a specific type of UE. The method includes transmitting a random access preamble based on the second random access configuration to an eNodeB (eNB) if the UE is a specific type of UE, and receiving a random access response based on the specific type of UE from the eNB.

The first random access configuration may be configured for a first bandwidth, the second random access configuration may be configured for a second bandwidth, and the second bandwidth may be smaller bandwidth than the first bandwidth.

The UE may support the second bandwidth, but does not support the first bandwidth.

The method may further include receiving the first random access configuration and the second random access via system information from the eNB.

The first random access configuration and the second random access may be received via different system information blocks respectively.

The second random access configuration may include a set of random access preamble identifiers (IDs) for the specific type of UE, time/frequency resources for the random access procedure for the specific type of UE, and a random access radio network temporary identity (RA-RNTI) used for the random access procedure for the specific type of UE.

The random access preamble may include a random access preamble ID selected from the set of random access preamble IDs for the specific type of UE.

The method may further include checking an RA-RNTI for the specific type of UE on a physical downlink control channel (PDCCH) to receive the random access response from the eNB.

The specific type of UE may be one of low-end UEs, low-cost UEs, machine type communication (MTC) devices, device to device communication (D2D) devices, low-cost MTC devices and low-cost D2D devices.

In another aspect, a method of establishing, by a user equipment (UE), a connection in a wireless communication system is provided. The method includes transmitting a connection request message including bandwidth related information to an eNodeB (eNB).

The bandwidth related information may include an indicator indicating that the UE supports either a narrow bandwidth or a wide bandwidth.

The connection request message may be transmitted using a hybrid automatic repeat request (HARQ).

The method may further include receiving a connection setup message from the eNB, and transmitting a connection setup complete message to the eNB.

The connection setup complete message may include the bandwidth related information.

The UE may be one of low-end UEs, low-cost UEs, machine type communication (MTC) devices, device to device communication (D2D) devices, low-cost MTC devices and low-cost D2D devices.

A random access procedure and a connection establishment for a specific type of UE, e.g. an MTC device, are efficiently defined.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
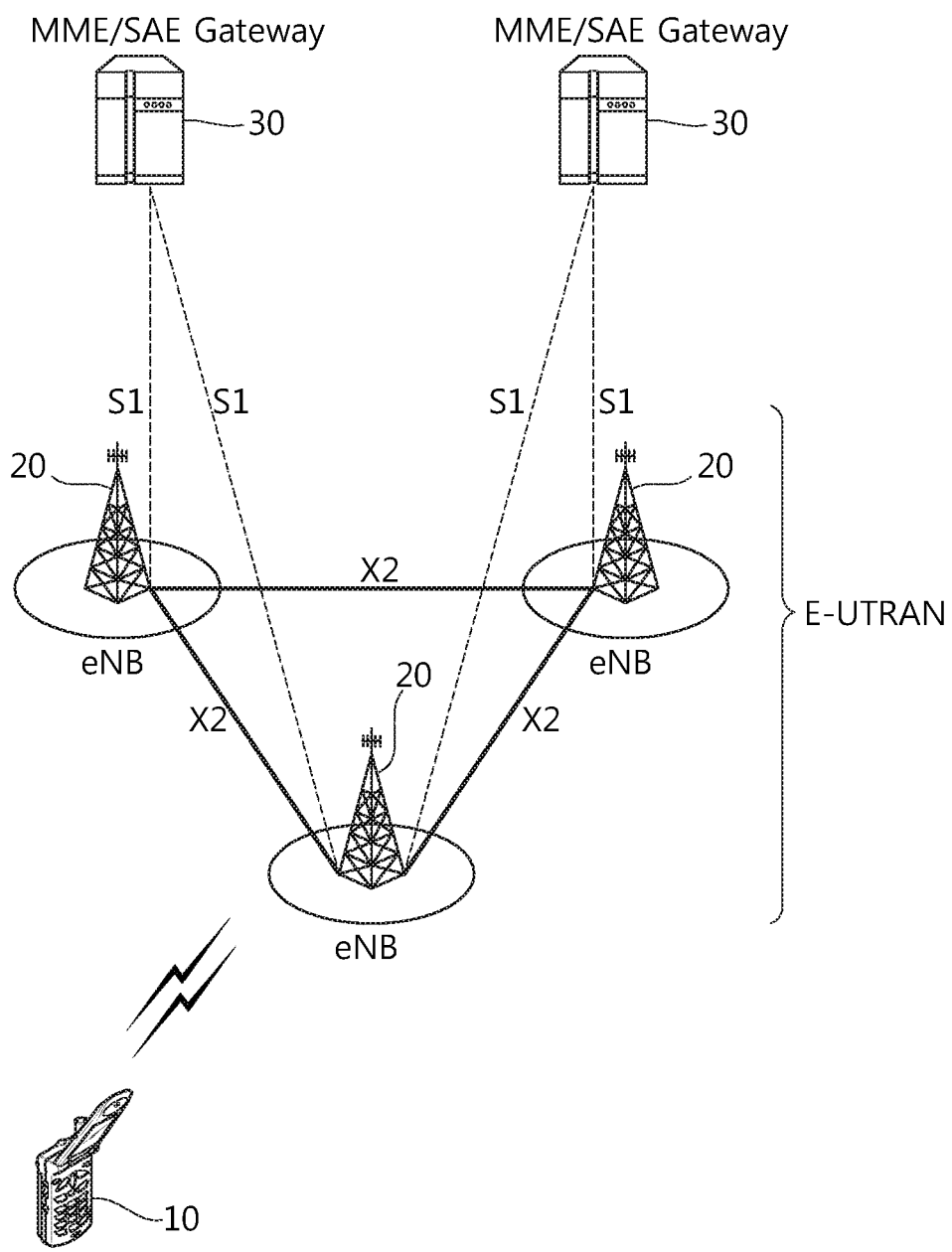
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
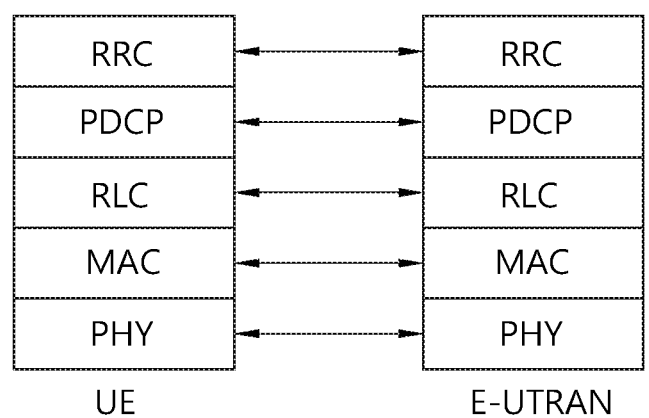
FIG. 2 is a diagram showing radio interface protocol architecture for a control plane.
Figure 3:
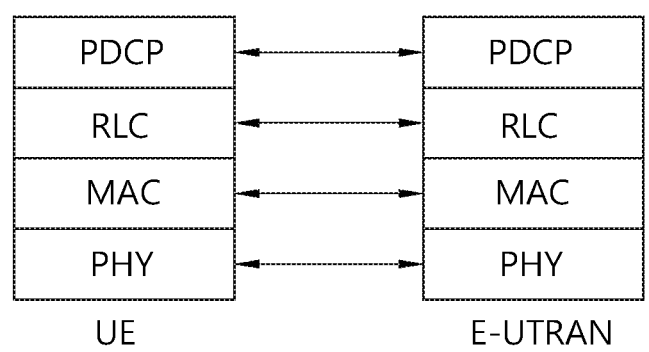
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
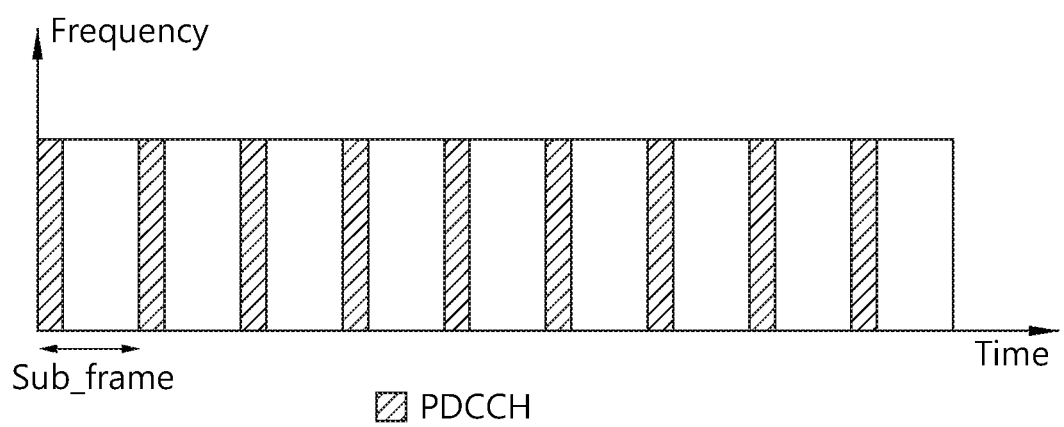
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

A random access procedure is described.

The UE can perform a random access procedure in the following cases.

When the UE performs an initial access to the BS in a situation where there is no RRC connection with the BS.

When the UE initially accesses to a target cell in a handover procedure.

When it is requested by a command of the BS.

When data to be transmitted in an uplink is generated in a situation where uplink time misalignment occurs or a designated radio resource used to request a radio resource is not allocated.

When a recovery process is performed at the occurrence of a radio link failure or a handover failure.

In an LTE system, a non-contention based random access procedure allocating, by a BS, a designated (or dedicated) random access preamble to a particular UE and randomly accessing, by the UE, with the random access preamble is provided. In other words, the procedure of selecting a random access preamble includes a contention based random access procedure that a UE randomly selects one random access preamble from a particular set and uses the same and a non-contention based random access procedure that a UE uses a random access preamble allocated thereto. A difference between the two random access procedures lies in a generation of collision due to contention as described hereinafter. The non-contention based random access procedure may be used only when the foregoing handover process is performed or when it is requested by a command from a BS.

Figure 5:
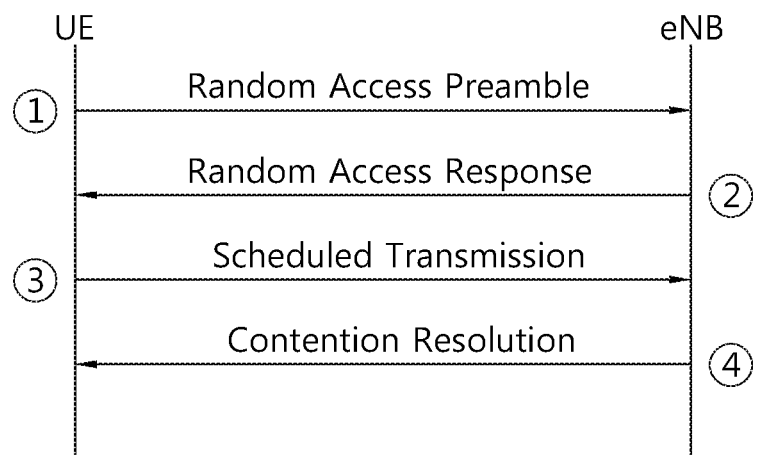
FIG. 5 shows an example of an operation process of a UE and a base station in a contention-based random access procedure.

FIG. 5 shows an example of an operation process of a UE and a base station in a contention-based random access procedure.

1. In the contention based random access, a UE randomly selects one random access from a set of random access preambles indicated by system information or a handover command, selects a PRACH resource able to transmit the random access preamble, and transmits the same.

2. After the random access preamble is transmitted, the UE attempts to receive a random access response thereof within a random access response reception window indicated by the system information or the handover command. In detail, the random access response information is transmitted in the form of a MAC PDU, and the MAC PDU is transferred on a PDSCH. In order to allow the UE to properly receive the information transmitted on the PDSCH, a PDCCH is also transferred together. Namely, the PDCCH includes information regarding a UE which is to receive the PDSCH, frequency and time information of radio resource of the PDSCH, a transmission format of the PDSCH, and the like. When the UE successfully receives the PDCCH destined therefor, the UE appropriately receives the random access response transmitted on the PDSCH according to the information items of the PDCCH. The random access response includes a random access preamble identifier (ID), a UL grant (uplink radio resource), a temporary cell radio network temporary identity (C-RNTI), and a time alignment command (TAC). In the above, the reason why the random access preamble identifier is required is because, since a single random access response may include random access response information for one or more UEs, so the random access preamble identifier informs for which UE the UL grant, temporary C-RNTI, and TAC are valid. The random access preamble identifier is identical to a random access preamble selected by the UE in 1.

3. When the UE receives the random access response valid therefor, the UE processes the information items included in the random access response. Namely, the UE applies the TAC and stores the temporary C-RNTI. Also, the UE transmits data stored in a buffer thereof or newly generated data to the BS by using the UL grant. In this case, an identifier of the UE should be included in the data included in the UL grant. The reason is because, in the contention based random access procedure, the BS cannot determine which UEs perform the random access procedure, so in order to resolve collision later, the BS should identify UEs. Also, there are two types of methods for including an identifier of the UE. A first method is that when the UE has a valid cell identifier already allocated in the corresponding cell before the random access procedure, the UE transmits its cell identifier through the UL grant. Meanwhile, when the UE has not been allocated a valid cell identifier before the random access procedure, the UE includes its unique identifier (e.g., an S-TMSI or a random ID) in data and transmits the same. In general, the unique identifier is longer than a cell identifier. When the UE transmits the data through the UL grant, the UE starts a contention resolution timer.

4. After the UE transmits the data including its identifier through the UL grant included in the random access response, the UE waits for an instruction from the BS for a collision resolution. Namely, in order to receive a particular message, the UE attempts to receive a PDCCH. There are two methods for receiving a PDCCH. As mentioned above, when the identifier of the UE transmitted through the UL grant is a cell identifier, the UE attempts to receive a PDCCH by using its cell identifier, and when the identifier is a unique identifier, the UE attempts to receive a PDCCH by using the temporary C-RNTI included in the random access response. Thereafter, in the former case, when a PDCCH is received through its cell identifier before the contention resolution timer expires, the UE determines that the random access procedure has been normally performed, and terminates the random access procedure. In the latter case, when the UE receives a PDCCH through the temporary cell identifier before the contention resolution time expires, the UE checks data transferred by the PDSCH indicated by the PDCCH. When the data content includes its unique identifier, the UE determines that the random access procedure has been normally performed, and terminates the random access procedure.

Figure 6:
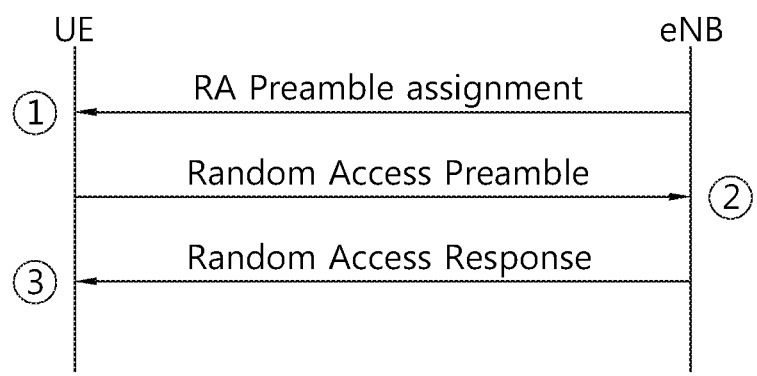
FIG. 6 shows an example of an operation process of a UE and that a base station in a non-contention based random access procedure.

FIG. 6 shows an example of an operation process of a UE and that a base station in a non-contention based random access procedure. Additionally, in comparison to the contention based random access procedure, in the non-contention based random access procedure, upon receiving random access response information, it is determined that a random access procedure has been normally performed, and the random access procedure is terminated.

1. As mentioned above, the non-contention based random access procedure may exist, first, in the case of a handover process, and second, in the case of being requested by a command from a BS. Of course, in the two cases, the contention based random access procedure may be performed. First, for the non-contention based random access procedure, it is important to receive a designated random access preamble eliminating a possibility of collision. A method of receiving an indication of the random access preamble includes a handover command and a PDCCH command.

2. After receiving the allocated random access preamble designated only for the UE, the UE transmits the preamble to the BS.

3. A method of receiving random access response information is the same as that in the contention-based random access procedure.

Figure 7:
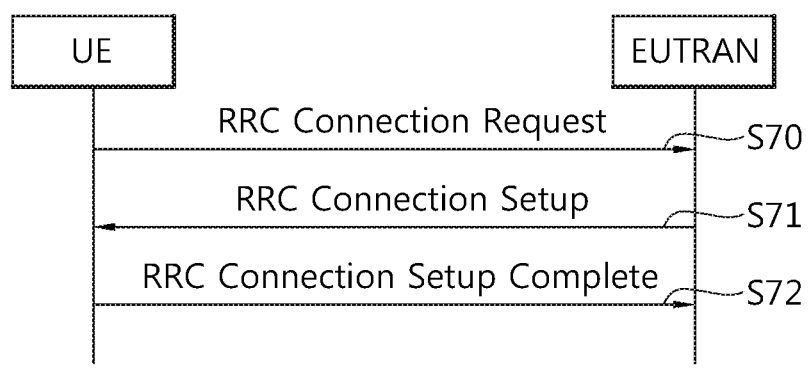
FIG. 7 shows an example of an RRC connection establishment procedure.

FIG. 7 shows an example of an RRC connection establishment procedure.

The purpose of this procedure is to establish an RRC connection. At step S70, an E-TURAN transmits an RRC connection request message to a UE. At step S71, the UE transmits an RRC connection setup message to the E-UTRAN. At step S72, the E-UTRAN transmits an RRC connection setup complete message to the UE. RRC connection establishment involves SRB1 establishment. The procedure is also used to transfer the initial non-access stratum (NAS) dedicated information/message from the UE to the E-UTRAN.

If a UE is a specific type of UE, a random access procedure and/or a connection establishment procedure for the specific type of UE may be required. For example, a random access procedure and/or a connection establishment procedure for a machine-type communication (MTC) device may be required.

A random access procedure and a connection establishment procedure for a specific type of UE according to embodiments of the present invention are described below.

According to embodiments of the present invention, a UE finds an eNB broadcasting a first set of random access configuration and a second set of random access configuration, and determines one set of random access configuration from the first set of random access configuration and the second set of random access configuration. The UE transmits a random access preamble based on the determined set of random access configuration to the eNB for establishing a connection to the eNB. The one set of random access configuration may be determined based on a specific type of UE. The specific type of UE may be one of low-end UE, low-cost UE, MTC device, device to device communication (D2D) device, low-cost MTC device and low-cost D2D device.

Further, the UE may receive a random access response allocated to the specific type of UE from the eNB. The eNB may provide two different RNTIs to different sets of random access configurations. If the UE is the specific type of UE, the UE may identify scheduled random access response by using a random access RNTI (RA-RNTI) that is allocated to the specific type of UE.

On receiving the random access response, the UE transmits a connection request message to the eNB. The connection request message may indicate to the eNB that the UE supports a limited bandwidth only.

Figure 8:
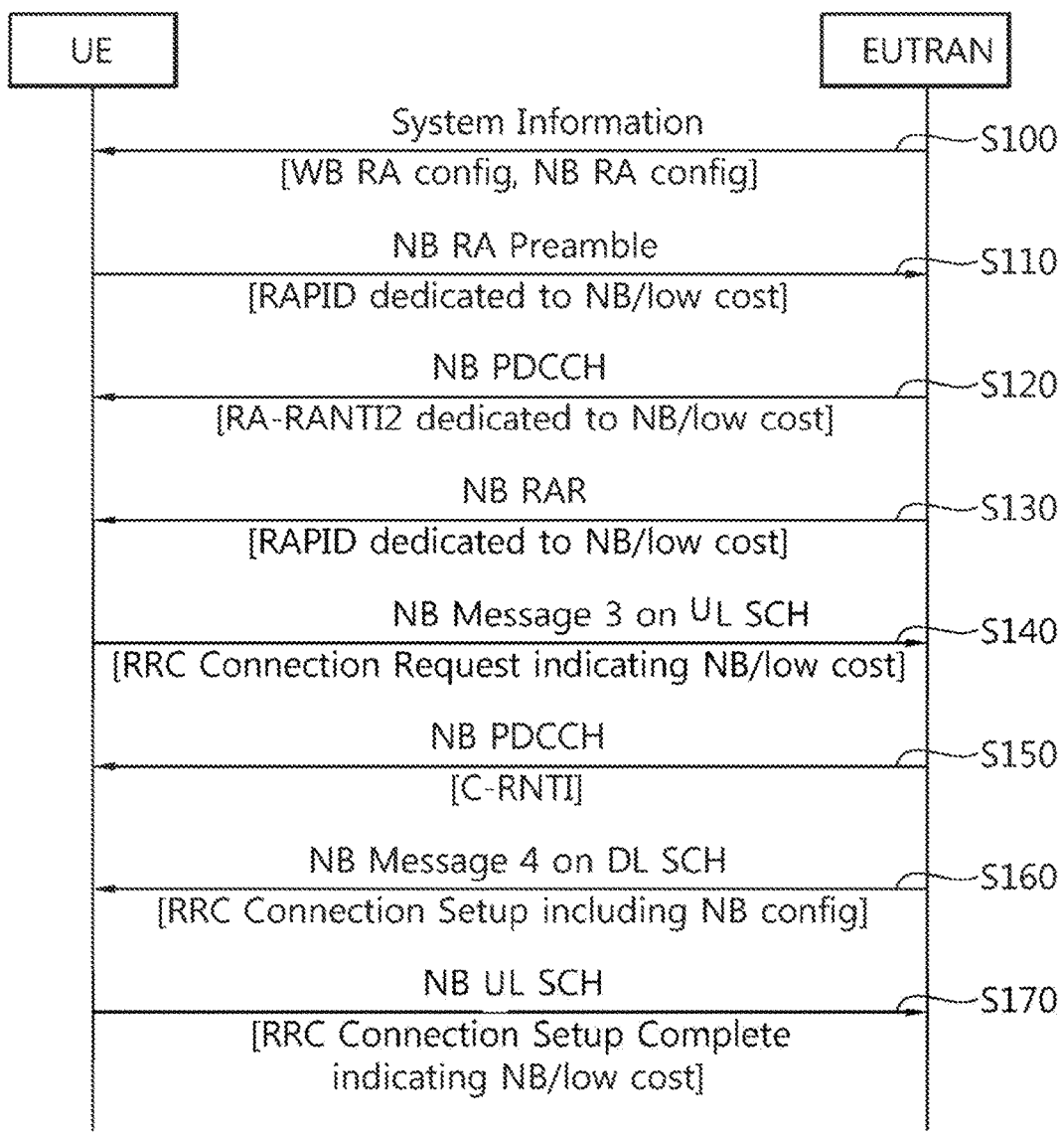
FIG. 8 shows an example of a method for performing a random access procedure and a connection establishment for a specific type of UE according to an embodiment of the present invention.

FIG. 8 shows an example of a method for performing a random access procedure and a connection establishment for a specific type of UE according to an embodiment of the present invention.

At step S100, an eNB broadcasts random access configurations via system information to a UE. The eNB provides a first random access configuration and a second random access configuration. The first random access configuration may be a wideband (WB) random access configuration, and the second random access configuration may be a narrowband (NB) random access configuration.

If control information or user data is scheduled over a bandwidth of 20 MHz, a specific type of UEs, i.e. low-end UEs, may be unable to receive the scheduled control information or user data. In addition, the specific type of UEs may be unable to transmit control information or user data over the bandwidth of 20 MHz or beyond. Thus, if the UE is the specific type of UE, the UE may receive system information containing NB random access configuration. If the UE is not the specific type of UE, the UE may receive system information containing WB random access configuration. The UE may configure a random access procedure based on one of the WB random access configuration and the NB random access configuration based on the type of the UE.

Different system information blocks (SIBs) may contain different random access configurations respectively. For example, an SIB2, which is a system information block for normal UEs, may contain the WB random access configuration, and an SIB2a, which is a system information block for a specific type of UEs, may contain NB random access configuration. The WB random access configuration may contain control information on an RACH used by all normal UEs, except a specific type of UEs, supporting at least 20 MHz bandwidth in 3GPP LTE. The NB random access configuration may contain control information on the RACH used by the specific type of UEs, i.e. low-end UEs such as low-cost MTC devices. The specific type of UEs may not support up to 20 MHz bandwidth in 3GPP LTE. The NB random access configuration may also contain radio resources used by the NB random access procedure, such as a set of random access preamble IDs, time/frequency resource for the NB random access procedure, and RA-RNTI2 used for the NB random access procedure. On the other hand, RA-RNTI is used for WB random access procedure.

If the UE is the specific type of UE, e.g. low-cost MTC device, the UE configures the NB random access procedure based on the NB random access configuration received via the system information. Then, upon request of an RRC connection establishment from a NAS layer, an RRC layer of the UE initiates an RRC connection establishment procedure and instructs a MAC layer of the UE to perform the NB random access procedure.

If the UE is the specific type of UE, at step S110, the MAC layer of the UE performs the NB random access procedure by transmitting a random access preamble to the eNB. The random access preamble may contain a random access preamble ID dedicated to the specific type of UEs, which is selected from a set of random access preamble IDs included in the NB random access configuration. The UE may transmit the random access preamble through a limited bandwidth, i.e. narrowband, which may be allocated by the NB random access configuration.

At step S120, after transmitting the random access preamble, the UE monitors a PDCCH to receive a random access response. If the UE is the specific type of UE, the UE may monitor an NB PDCCH which is scheduled within a narrowband based on the NB random access configuration. RA-RNTI2 may be assigned for the NB random access procedure, while RA-RNTI is assigned for the WB random access procedure. Thus, if the UE is the specific type of UE, the UE detects the RA-RNTI2 on the NB PDCCH within a certain period to receive an NB random access response that is scheduled within a limited bandwidth.

At step S130, if the UE, which is the specific type of UE, decodes the RA-RNTI2 on the NB PDCCH, the UE receives the NB random access response from the eNB on a DL-SCH according to control information carried on the NB PDCCH together with the RA-RNTI2. If the NB random access response contains the random access preamble ID which is transmitted by the UE within a certain period at step S110, the UE may proceeds to next steps. If the UE fails to receive the NB random access response containing the random access preamble ID within the certain period from the eNB, the UE may transmit a NB random access preamble to the eNB according to step S110 again.

If the NB random access response contains the random access preamble ID transmitted by the UE within the certain period, at step S140, the UE transmits an RRC connection request message to the eNB on the UL-SCH according to scheduling information included in the NB random access response. If the UE is the specific type of UE, the UE may transmit the RRC connection request message to the eNB through a limited bandwidth based on the scheduling information included in the NB random access response. The RRC connection request message may indicate the eNB that the UE is the specific type of UE, e.g. low-end or low-cost device.

The UE may use a hybrid automatic repeat request (HARQ) to transmit the RRC connection request message. After receiving the RRC connection request message from the UE, the eNB may transmit an HARQ feedback to the UE. In this case, the HARQ feedback should be transmitted through the limited bandwidth because the UE is the specific type of UE. If the UE receives an acknowledgement (ACK) for the HARQ feedback, the UE may consider that HARQ transmission of the RRC connection request message is successfully completed.

After successfully transmitting the RRC connection request message, at step S150, the UE monitors the NB PDCCH to receive an RRC connection setup message from the eNB. If the UE decodes a C-RNTI which is included in the received NB random access response via the NB PDCCH, the UE may receive the DL-SCH.

At step S160, the UE receives the RRC connection setup message via the DL-SCH from the eNB, in response to the RRC connection request message. The RRC connection setup message may include an NB radio resource configuration.

At step S170, the UE transmits an RRC connection setup complete message to the eNB to complete the RRC Connection Establishment procedure. The RRC connection setup complete message may indicate the eNB that the UE is the specific type of UE, e,g. low-end or low-cost device, especially if the RRC connection request message does not indicate that the UE is the specific type of UE.

While the specific type of UE is connected to the eNB, the eNB may require low-end UE capability including UE capability related to the narrowband. If the eNB requests the low-end UE capability, the UE may transmit the low-end UE capability to the eNB. The eNB may transfer the low-end UE capability to an MME and then the MME stores the low-end UE capability. Afterwards, whenever the UE is connected to any eNB, the MME transmits the low-end UE capability to the eNB. Thus, the eNB can properly signal a radio configuration to the specific type of UE according to the low-end UE capability.

Figure 9:
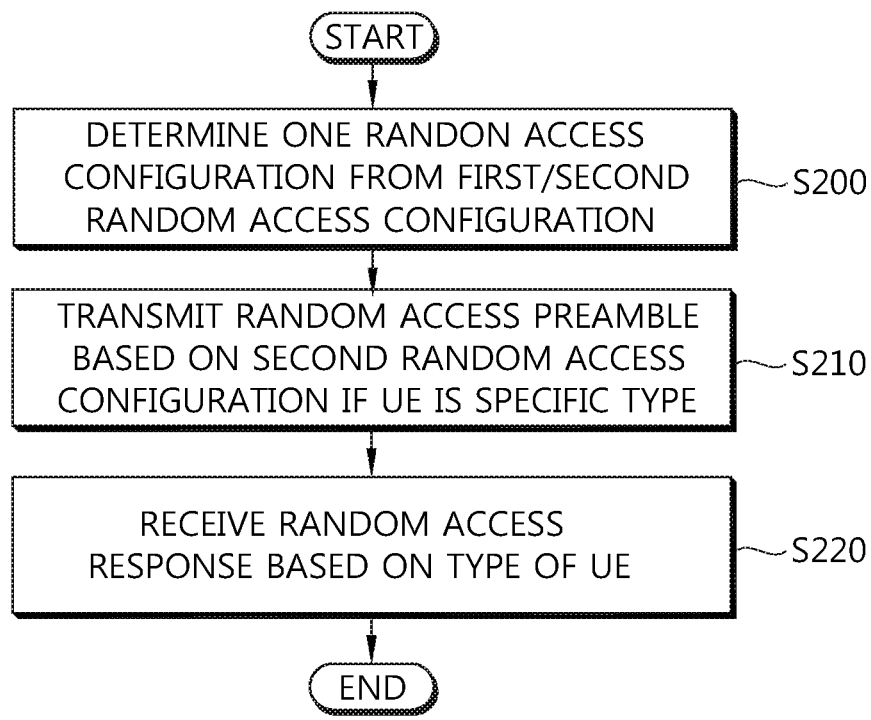
FIG. 9 shows an example of a method for performing a random access procedure for a specific type of UE according to an embodiment of the present invention.

FIG. 9 shows an example of a method for performing a random access procedure for a specific type of UE according to an embodiment of the present invention.

At step S200, a UE determines one random access configuration from a first random access configuration and a second random access configuration, which are received via system information from an eNB. The first random access configuration is a random access configuration for a normal type of UE, and the second random access configuration is a random access configuration for a specific type of UE. The first random access configuration may be configured for a first bandwidth, and the second random access configuration may be configured for a second bandwidth, which is smaller bandwidth than the first bandwidth. The UE may support the second bandwidth, but may not support the first bandwidth. That is, the specific type of UE may be one of low-end UEs, low-cost UEs, MTC devices, D2D devices, low-cost MTC devices and low-cost D2D devices. The second random access configuration may include a set of random access preamble IDs for the specific type of UE, time/frequency resources for the random access procedure for the specific type of UE, and an RA-RNTI used for the random access procedure for the specific type of UE.

At step S210, the UE transmits a random access preamble based on the second random access configuration to the eNB if the UE is a specific type of UE. The random access preamble may include a random access preamble ID selected from the set of random access preamble IDs for the specific type of UE.

The UE checks an RA-RNTI for the specific type of UE on a physical downlink control channel (PDCCH) to receive a random access response from the eNB. At step S220, the UE receives the random access response based on the specific type of UE from the eNB.

Figure 10:
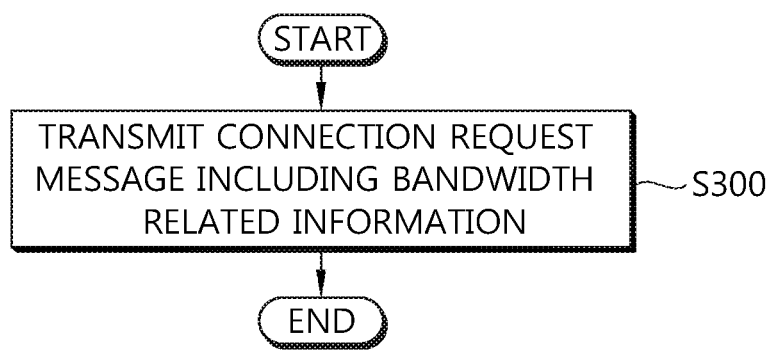
FIG. 10 shows an example of a method for establishing a connection for a specific type of UE according to an embodiment of the present invention.

FIG. 10 shows an example of a method for establishing a connection for a specific type of UE according to an embodiment of the present invention.

At step S300, a UE transmits a connection request message including bandwidth related information to an eNB. The UE may be one of low-end UEs, low-cost UEs, machine type communication (MTC) devices, device to device communication (D2D) devices, low-cost MTC devices and low-cost D2D devices.

The connection request message may be an RRC connection request message. The bandwidth related information may include an indicator indicating that the UE supports either a narrow bandwidth or a wide bandwidth. Further, the connection request message may be transmitted using an HARQ.

On transmitting the connection request message, the UE receives a connection setup message from the eNB, and transmits a connection setup complete message to the eNB. The connection setup complete message may include the bandwidth related information.

According to embodiments of the present invention described above, a random access procedure for a specific type of UE and a connection establishment procedure for a specific type of UE can be defined. For this, an NB random access configuration, a random access preamble ID for the specific type of UE, an RA-RNTI for the specific type of UE, etc, may be newly defined.

Figure 11:
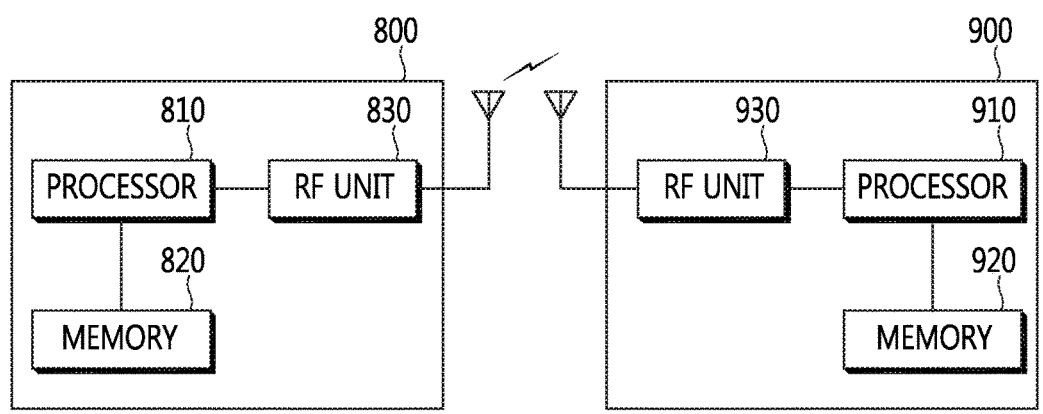
FIG. 11 is a block diagram showing wireless communication system to implement an embodiment of the present invention.

FIG. 11 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by an evolved NodeB (eNB) in a wireless communication system, the method comprising:
    receiving, by the eNB, a random access preamble from a user equipment (UE);
    transmitting, by the eNB, a random access response which is a response to the random access preamble to the UE;
    receiving, by the eNB, a message 3 of a random access procedure from the UE, wherein the message 3 is used for determining that the UE is a low-end UE;
    receiving, by the eNB, a low-end UE capability from the UE; and
    transferring, by the eNB, the low-end UE capability to a mobility management entity (MME), wherein the low-end UE capability is transmitted by the MME to another eNB, and
    wherein the low-end UE includes a low-cost machine-type communication (MTC) device.

2. The method of claim 1, wherein the low-end UE supports a reduced bandwidth.

3. The method of claim 1, wherein the message 3 corresponds to a radio resource control (RRC) connection request message.

4. An evolved NodeB (eNB) in a wireless communication system, the eNB comprising:
    a memory;
    a radio frequency (RF) unit; and
    a processor, operably coupled to the memory and the RF unit, that:
    controls the RF unit to receive a random access preamble from a user equipment (UE);
    controls the RF unit to transmit a random access response which is a response to the random access preamble to the UE;
    controls the RF unit to receive a message 3 of a random access procedure from the UE, wherein the message 3 is used for determining that the UE is a low-end UE;
    controls the RF unit to receive a low-end UE capability from the UE; and
    controls the RF unit to transfer the low-end UE capability to a mobility management entity (MME), wherein the low-end UE capability is transmitted by the MME to another eNB, and
    wherein the low-end UE includes a low-cost machine-type communication (MTC) device.

5. The eNB of claim 4, wherein the low-end UE supports a reduced bandwidth.

6. The eNB of claim 4, wherein the message 3 corresponds to a radio resource control (RRC) connection request message.

* * * * *